United States Patent
Madar et al.

(10) Patent No.: US 8,924,895 B2
(45) Date of Patent: Dec. 30, 2014

(54) EXTRACTION OF VIDEO PICTURE SCREEN SAVER FUNCTION

(75) Inventors: Piero Andreas Madar, Indianapolis, IN (US); Swee Swee Tang, Singapore (SG)

(73) Assignee: Thomson Licensing, Issy-les moulineaux (FR)

( * ) Notice: Subject to any disclaimer, the term of this patent is extended or adjusted under 35 U.S.C. 154(b) by 1043 days.

(21) Appl. No.: 11/918,772

(22) PCT Filed: Dec. 12, 2005

(86) PCT No.: PCT/US2005/045130
§ 371 (c)(1),
(2), (4) Date: Jan. 23, 2009

(87) PCT Pub. No.: WO2006/115544
PCT Pub. Date: Nov. 2, 2006

(65) Prior Publication Data
US 2009/0217212 A1  Aug. 27, 2009

Related U.S. Application Data

(60) Provisional application No. 60/673,400, filed on Apr. 21, 2005.

(51) Int. Cl.
| | |
|---|---|
| *G06F 3/048* | (2013.01) |
| *G09G 5/00* | (2006.01) |
| *H04N 5/85* | (2006.01) |
| *G06F 3/14* | (2006.01) |

(52) U.S. Cl.
CPC ..... *G09G 5/005* (2013.01); *H04N 5/85* (2013.01); *G09G 2330/022* (2013.01); *G06F 3/14* (2013.01)
USPC .......................................... 715/867; 345/473

(58) Field of Classification Search
CPC ............................................ G06F 3/14
USPC .......................................... 715/867; 345/473
See application file for complete search history.

(56) References Cited

U.S. PATENT DOCUMENTS

| 5,796,945 A | 8/1998 | Tarabella |
|---|---|---|
| 6,285,349 B1 | 9/2001 | Smith |

(Continued)

FOREIGN PATENT DOCUMENTS

| DE | 100 40 680 A1 | 8/2000 |
|---|---|---|
| EP | 1 130 525 A2 | 9/2001 |

(Continued)

OTHER PUBLICATIONS

Supplementary European Search Report for Ep 05 85 3940 dated 13 May 2009.

(Continued)

*Primary Examiner* — Linh K Pham
(74) *Attorney, Agent, or Firm* — Robert D. Shedd; Reitseng Lin

(57) ABSTRACT

The apparatus and method for extracting a single picture image from a video file saved in a storage device (20) of the electronic device (10) and performing a screen saver function using the extracted single picture image. The screen saver function may extract a plurality of single picture images from the saved video files of the electronic device. The plurality of single picture images can be provided from the random and/or sequential location of the video file data (10).

12 Claims, 3 Drawing Sheets

(56) References Cited

U.S. PATENT DOCUMENTS

| | | |
|---|---|---|
| 6,486,900 B1 | 11/2002 | Shen et al. |
| 6,507,351 B1 | 1/2003 | Bixler |
| 6,590,590 B1 * | 7/2003 | Wen et al. .................... 715/764 |
| 6,851,093 B2 * | 2/2005 | Kawakita ...................... 715/867 |
| 7,038,668 B2 * | 5/2006 | Kota et al. .................... 345/204 |
| 2002/0055992 A1 | 5/2002 | King et al. |
| 2002/0097259 A1 | 7/2002 | Marshall et al. |
| 2002/0113828 A1 * | 8/2002 | Kawakita ...................... 345/867 |
| 2003/0063090 A1 * | 4/2003 | Kraft et al. ................... 345/475 |
| 2003/0126136 A1 * | 7/2003 | Omoigui ......................... 707/10 |
| 2003/0214527 A1 | 11/2003 | Paul |
| 2003/0227493 A1 | 12/2003 | Yokomizo |
| 2005/0155012 A1 * | 7/2005 | Tayama et al. ................ 717/101 |
| 2006/0123385 A1 * | 6/2006 | Medvedev et al. ............ 717/100 |
| 2006/0176317 A1 * | 8/2006 | Tamaki et al. ................ 345/629 |
| 2007/0006102 A1 * | 1/2007 | Walker .......................... 715/867 |

FOREIGN PATENT DOCUMENTS

| | | | | |
|---|---|---|---|---|
| FR | 2 844 632 A1 | 8/2003 | | |
| JP | 07199889 | * 8/1995 | ............... | G09G 5/14 |
| JP | 10232660 | 9/1998 | | |
| JP | 11065541 | 3/1999 | | |
| JP | 11313229 | 11/1999 | | |
| JP | 2000-50207 A | 2/2000 | | |
| JP | 2000050207 A * | 2/2000 | ............... | H04N 5/92 |
| JP | 2000341461 | 12/2000 | | |
| JP | 2001285804 | 10/2001 | | |
| JP | 2002094919 | 3/2002 | | |
| JP | 2003069955 | 3/2003 | | |
| JP | 2004120604 A | 4/2004 | | |
| JP | 2004214749 | 7/2004 | | |
| JP | 2004-336262 | 11/2004 | | |
| JP | 2004336262 | * 11/2004 | ............... | H04N 5/93 |
| KR | 1020010092568 A | 10/2001 | | |
| WO | WO 01/88689 A1 | 11/2001 | | |
| WO | WO 0188689 A1 * | 11/2001 | | |
| WO | WO 02/01857 A1 | 1/2002 | | |
| WO | WO 02/11138 A1 | 2/2002 | | |

OTHER PUBLICATIONS

Search Report dated Jul. 26, 2006.

* cited by examiner

EXTRACTION OF VIDEO PICTURE SCREEN SAVER FUNCTION

CROSS-REFERENCE TO RELATED APPLICATIONS

This application claims the benefit, under 35 U.S.C. §365 of International Application PCT/US2005/045130 filed Dec. 12, 2005, which was published in accordance with PCT Article 21(2) on Nov. 2, 2006 in English and claims priority of U.S. Provisional patent application No. 60/673,400 filed Apr. 21, 2005.

TECHNICAL FIELD

The present invention relates to screen saving functions in electronic devices and, more particularly, to a screen saving function that utilizes image data from video saved on a storage medium of the electronic device.

BACKGROUND ART

Screensaver applications for electronic devices are well known. A screensaver application is a program or routine designed to protect a display from damage such as screen burn (i.e. the burning of a fixed pattern onto the display) as well as to conserve image quality of a display by blanking the screen or filling it with moving images or patterns when the associated electronic device is not in use. Computers have long used screen saver applications.

With respect to electronic devices constituting televisions and television system components, screensaver applications are also used. For example, some electronic devices such as DVD players/recorders have a screen saving function that is invoked when a user does not perform any input or action for a predetermined period of time (e.g. five minutes). The screen saver will blank the output to the television screen and begin to provide a floating image for display, such as a company logo or the like.

The screen saver image is normally a bitmap image that is typically stored directly in non-volatile memory that is part of the operating system of the electronic device. As such, the screen saver image is fixed and thus cannot be changed. When invoked, the screen saver extracts this bitmap image and feeds the image directly into a video decoder or on screen display (OSD) memory in the electronic device for presentation. It can therefore be appreciated that screensaver applications in such electronic devices are limited.

SUMMARY OF THE INVENTION

According to the principles of the invention, when a screen saver application in an electronic device is invoked, the screen saver extracts an image from a video file saved in a storage device and performs a screen saver function utilizing the extracted image.

For example, a screen saver of a DVD player/recorder is operable to extract a picture from video recorded on a DVD associated with the DVD player/recorder during a screen saver function. The extracted picture would then be used during the screen saver function.

The screen saver may extract several different images from a video file for performing the screen saver function. The several different images can be extracted from sequential images of the video file (i.e. sequentially extracted or sequential extraction). Alternatively, the several different images can be extracted from random locations of the video file (i.e. randomly extracted or random extraction). Instead, some of the different images may be extracted sequentially while some of the different images may be extracted randomly.

According to an aspect of the present invention, the screen saver application may provide a fade-in/fade-out feature when changing from one extracted picture to another extracted picture during the screen saver function.

In one form, the present screen saver application creates a picture image from a video file, such as a movie in a DVD, by searching the DVD for video or picture data. The picture data may be of a particular format such as JPEG picture data or otherwise. The located picture image/data is extracted, scaled down appropriately, and converted into an appropriate format, such as bitmap, suitable for video presentation. The processed picture is then provided to OSD memory, circuitry/logic or the video decoder section of the electronic device for presentation to a display.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views.

DETAILED DESCRIPTION OF A PREFERRED EMBODIMENT

Figure 1:
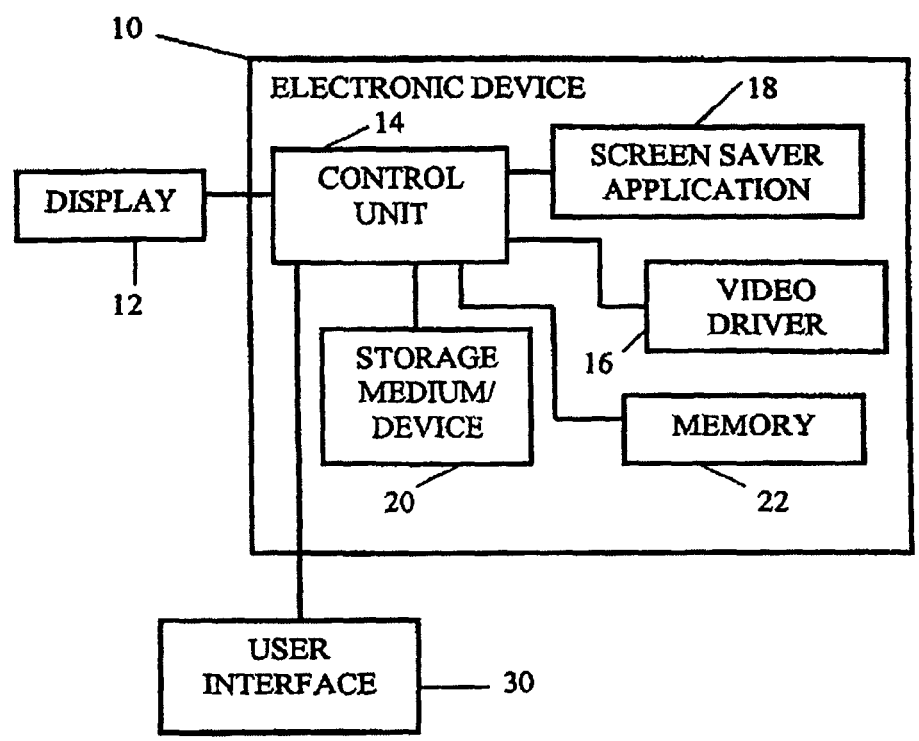
FIG. 1 is a block diagram of an exemplary electronic device that implements/embodies the present invention.

FIG. 1 is a representation of an electronic device, generally designated 10, in which and/or which implements a screen saver application in accordance with the principles presented herein. The electronic device 10 is typically used in conjunction with a display or screen 12 that may be integral with the electronic device 10 or may be external to the electronic device and in communication therewith. It should be appreciated that the electronic device 10 is representative of various types of electronic devices and particularly, is representative of electronic devices associated with television or television systems such as a television, a DVD player/recorder, VCR, PVR or the like. More particularly, but not limiting, the electronic device 10 represents a television or television system component that has or accepts a storage medium or device (e.g. a DVD player/recorder or PVR). However, the present screen saver application may be implemented in a computer system.

In addition to other known components consistent with the type of electronic device, the electronic device 10 has a control unit 14. The control unit 14 provides control of the electronic device and its components as necessary and appropriate for the proper functioning of the electronic device 10 including implementation of the present screen saver application, feature and/or function.

The electronic device 10 also has a storage medium or device 20. The storage medium 20 stores or has recorded thereon video files that have, contain or incorporate picture image files or data. The term storage device encompasses storage medium that can include optical medium or devices (e.g. DVD, CD), hard drive devices (e.g. PVR), solid state memory devices, of the type that are removable and not. The storage device may be the only one associated with the electronic device, or it may be one of several storage devices (e.g. a carousel type DVD player/recorder that holds several DVDs, a storage device external to but in communication with the electronic device, or a networked device). The storage device may be selected based on user preference. In the case of a DVD player/recorder, the storage medium 20 is a DVD. The DVD stores video files that include picture image files. The electronic device 10 may include a number of storage devices, may be capable of receiving and accessing a number of storage devices, and/or may be in communication with one or more storage devices associated with another electronic device.

The video files stored on/by the storage medium may include .mov, .avi, .asp, .mpeg and/or other file types typically suitable for the type of electronic device. Typically, only one type of video file is stored on/by the storage medium for use by the electronic device 10. The video files may contain one or more picture image files. The picture image files or media types may include JPEG, TIFF, GIF and/or the like. Each media type can be selected or de-selected for use by the screen saver application based on user preference via on-screen user preference menu(s).

A user interface 30 is provided for allowing a user to input data to the electronic device 10. A user may enter such data as channel change, volume, input to on-screen menus, input regarding user preferences regarding the present screen saver application 18 and the like. User preferences may be selected via an on-screen menu provided by and/or in conjunction with a video driver 16 under the control of the control unit 14. The user interface may take the form of an infrared remote control transmitter and receiver such as is known in the art.

The video driver 16 is configured, operable and/or adapted to provide video processing, decoding, on-screen display (OSD) of menus, text and the like such as is known in the art. The video driver 16 is typically under the control of the control unit 14.

It should be appreciated that the various features and/or functions of the various components of the electronic device 10 (e.g. control unit 14, screen saver application 18, and video driver 16) are implemented in circuitry, logic and/or programming or program instructions (e.g. firmware). The electronic device 10 also includes memory 22 such as is know in the art. The memory 22 is representative of memory for each of the various components of the electronic device 10 as necessary and/or appropriate.

In accordance with the principles of the present invention, the electronic device 10 also includes a screen saver application 18. The screen saver application 18 is invoked when the electronic device has been idle for a predetermined period of time, for example five (5) minutes. Typically and illustratively, the operating system programming of the electronic device provides a screen saver application start or event notification to invoke the screen saver application or programming.

The screen saver application 18 then searches the available storage medium for video files from which to extract a picture image file. The type of video file to search (or not search) may be dictated by user preference, set by the user through an on-screen preference menu. Once a video file is located, the screen saver application 18 extracts a picture image file (picture image, picture or image) from the video file. The extracted picture is then used during a screen saver function of the screen saver application.

The extraction of a picture image includes selecting a frame from a video file and decoding the frame to form a picture image. For example, any I frame in an MPEG file can be selected as a picture image. In fact, other types of MPEG frames can also be selected, although if a non-I frame is selected, either or both of the neighboring I frames may be involved during the decoding process to produce a picture image.

The screen saver may extract several different images from one or more video files for performing the screen saver function. Moreover, the several different images can be extracted from sequential images of or in the video file (i.e. sequential extraction or sequentially extracted). Alternatively, the several different images can be extracted from random locations of or in the video file (i.e. random extraction or randomly extracted). Instead, some of the different images may be extracted sequentially while some of the different images may be extracted randomly and from one or more video files. Each extracted picture image file is converted into a format appropriate for the display 12 and utilized by the screen saver application 18.

The present screen saver application 18 creates a picture image from a video file, such as a movie in a DVD, by searching the DVD for video or picture data. The picture data may be of a particular format such as JPEG picture data or otherwise. The located picture image/data is extracted, scaled down appropriately, and converted into an appropriate format, such as bitmap, suitable for video presentation. The processed picture is then provided to the video driver 16 (e.g. OSD/OSD memory) for presentation to the display 12.

According to an aspect of the present invention, the screen saver application 18 may provide a fade-in/fade-out feature when changing from one extracted picture to another extracted picture during the screen saver function.

Figure 2:
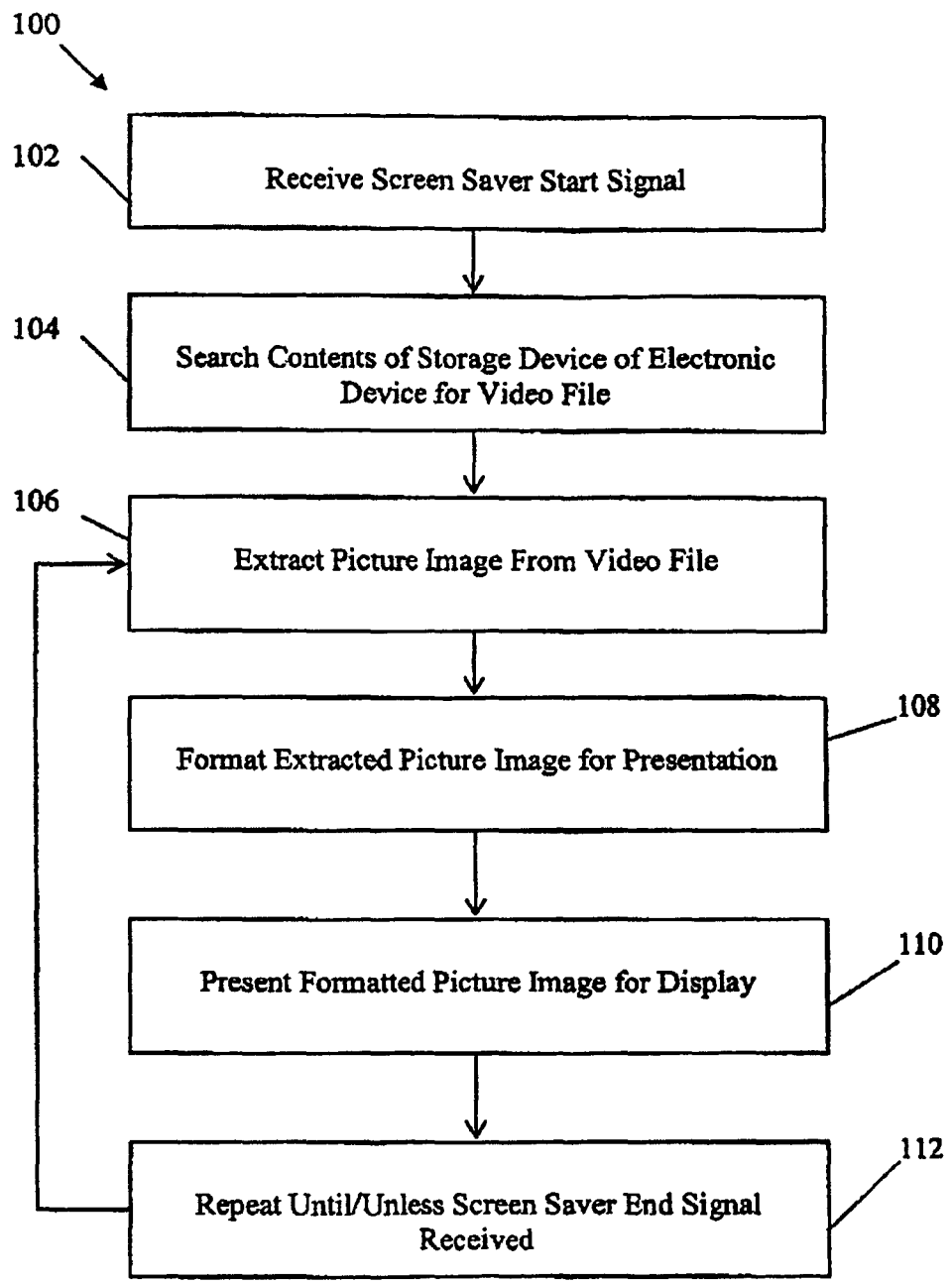
FIG. 2 is a flowchart of a manner of the electronic device of FIG. 1 implementing a screen saver function in an electronic device in accordance with the principles of the present invention.

FIG. 2 presents a flowchart, generally designated 100, of a process flow of a screen saver/saving method according to the principles of the present invention. Each block or box of the flowchart 100 represents a step of function implemented by the screen saver method/application.

In box 102, the screen saver first receives a screen saving signal to start the screen saving process, which illustratively is generated by operating system, screen saver application, or other system software of the electronic device, when the associated electronic device has been idle for a predetermined period of time (e.g. five minutes). In box 104, the screen saver searches content of a storage device of the electronic device for a video file. As explained above, the term storage device encompasses storage medium that can include optical medium or devices (e.g. DVD, CD), hard drive devices (e.g. DVR), solid state memory devices, of the type that are removable and not. The storage device may be the only one associated with the electronic device, or it may be one of several storage devices (e.g. a carousel type DVD player/recorder that holds several DVDs, or a storage device external to but in communication with the electronic device). The storage device may be selected based on user preference. The screen saver searches one or more types of video files or media types (e.g. .mov, .avi, .asp, .mpeg), again the types of which can be selected based on user preference. In this manner, the screen saver can exclude certain video media types.

In box 106, a picture image from the located video file is extracted for presentation or use by the screen saver. The screen saver may extract one or more types of picture image or image files or media types (e.g. JPEG, TIFF, GIF), again the types of which can be selected based on user preference. In this manner, the screen saver can exclude certain image media types.

In box 108, the extracted image/image file is formatted for presentation on a display (i.e. used by the screen saver). For example, the extracted image file is converted to a format, such as in bitmap, compatible with the display driver (display). In box 110, the formatted picture image is presented to the display driver or display (via OSD, video decoder or the like). Lastly, in box 112, the screen saver repeats from extraction on until or unless a screen saver end signal is received. The extraction of picture image files may be accomplished in a random manner, in a sequential manner, in a combination of random and sequential, and subject to user preference thereof.

Figure 3:
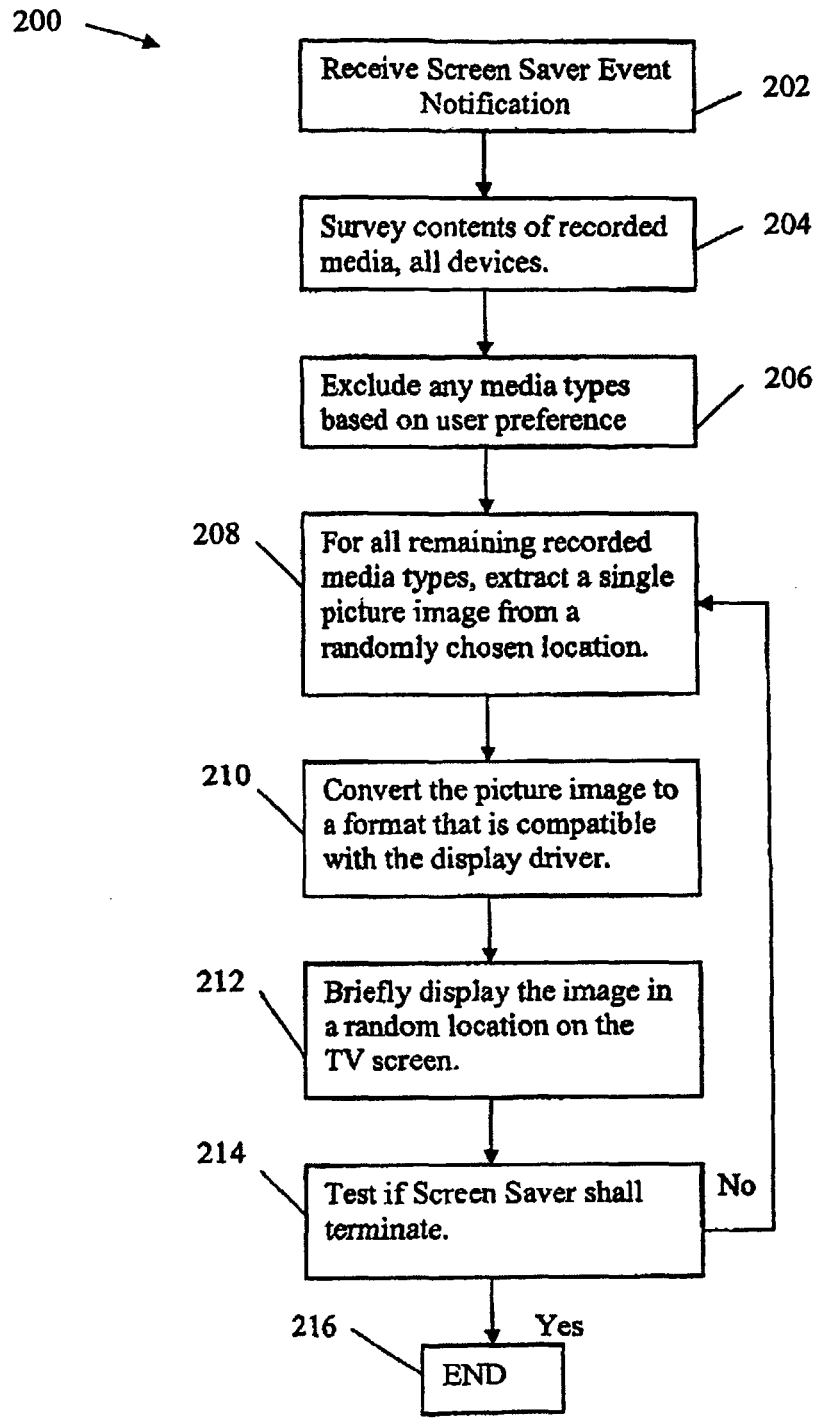
FIG. 3 is a flowchart of another manner of the electronic device of FIG. 1 implementing a screen saver function in an electronic device in accordance with the principles of the present invention.

FIG. 3 presents a flowchart, generally designated 200, of a process flow of a screen saver/saving method according to the principles of the present invention using a DVD player/recorder as an example. Each block or box of the flowchart 200 represents a step or function implemented by the screen saver method/application.

In box 202, the screen saver first receives a screen saving signal or event notification, which illustratively is generated by operating system, screen saver application, or other system software of the electronic device, when the associated electronic device has been idle for a predetermined period of time (e.g. five minutes). In box 204, the screen saver surveys or searches the content of recorded media in all storage devices. In box 206, a user, however, can specify media types for the screen saver to use and/or exclude. These can be based on user preferences.

In this illustration, in box 208, the screen saver randomly extracts an image from video content of the preferred media type(s). As indicated earlier herein, more than one image can be selected or chosen for use in a screen saving function, and these images can be extracted randomly, sequentially or both.

In box 210, the extracted image in this example is converted to a format, such as in bitmap, compatible with the display driver (display). In box 212, the screen saver briefly displays through the display driver the image in a random location on the display. As stated earlier, if more than one image is used, a fade-in/fade-out feature should be implemented when changing from one picture to another.

In box 214, before displaying the image in another random location, the screen saver should check whether the screen saving function should be terminated. For example, when the screen saver receives a signal from the operating system to terminate the screen saving function, the screen saver should terminate the screen saving function (i.e. "Yes") and thus in box 216, end. Otherwise (i.e. "No"), if the termination signal has not been received, the screen saver should display the picture in another random location, or else repeat the process from box 208 (of extracting a picture to randomly or sequentially extract another picture for the next display.

The architecture/electronic device of the figures is not exclusive. Other architectures and/or electronic devices may be derived in accordance with the principles of the invention to accomplish the same objectives. Further, the functions of the various elements shown and described herein may be implemented in whole or in part within the programmed instructions of a microprocessor, digital signal processor or the like.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and that fall within the limits of the appended claims.

The invention claimed is:

1. A method for an electronic device, the method comprising the steps of:
   receiving a screen saving signal;
   extracting a single picture image from a video file saved in a storage device associated with the electronic device in response to receipt of the screen saving signal, wherein the single picture image is an I-frame and the video file is an MPEG file;
   converting the extracted picture image to a format compatible with a display driver of a display associated with the electronic device;
   performing in response to receipt of the screen saving signal a screen saving function using the extracted single picture image so as to display the extracted single picture image on a display associated with the electronic device; and
   repeating the steps of extracting, converting, and performing until a screen saving end signal is received, wherein a user preference determines whether to repeat extracting a single picture image from a random location of the video file, sequential locations of the video file, or a combination of random and sequential locations of the video file.

2. The screen saving method of claim 1, wherein the step of performing a screen saving function includes displaying the single picture image in a random location on the display associated with the electronic device.

3. The screen saving method of claim 1, wherein the storage device comprises a DVD.

4. The screen saving method of claim 1, further comprising the step of applying a fade-in/fade-out function to each extracted picture image for presentation to the display associated with the electronic device.

5. A screen saving method for an electronic device, the method comprising the steps of:
   receiving a screen saving signal;
   searching contents of recorded media for a video file saved in a storage device associated with the electronic device in response to receipt of the screen saving signal;
   extracting a single picture image from a located video file in response to receipt of the screen saving signal, wherein the single picture image is an I-frame and the video file is an MPEG file;
   converting the single picture image to a format compatible with a display driver for a display associated with the electronic device;
   performing in response to receipt of the screen saving signal a screen saving function using the extracted single picture image so as to display the extracted single picture image on a display associated with the electronic device; and
   repeating the steps of extracting, converting, and performing until a screen saving end signal is received, wherein a user preference determines whether to repeat extracting a single picture image from a random location of the video file, sequential locations of the video file, or a combination of random and sequential locations of the video file.

6. The screen saving method of claim 5, wherein the storage device comprises a DVD.

7. The screen saving method of claim 5, wherein the step of searching includes receiving from a user a recorded media type to be excluded and the step of excluding from searching any recorded media type based on user selected preference.

8. The screen saving method of claim 5, wherein the step of performing a screen saving function includes displaying the single picture image in a random location on the display associated with the electronic device.

9. An electronic device comprising:

a control unit;

a storage device; and a screen saver application for:

receiving a screen saving signal from the control unit, extracting a single picture image from a video file accessible by the storage device in response to receipt of the screen saving signal, wherein the single picture image is an I-frame and the video file is an MPEG file, converting the extracted picture image to a format compatible with a display driver of a display associated with the electronic device and performing in response to receipt of the screen saving signal a screen saving function using the single picture image so as to display the extracted single picture image on a display associated with the electronic device, wherein the screen saver application is further able to repeat extracting single picture images from the video source, converting the extracted picture image and performing the screen saver function with the extracted single picture images until a screen saving end signal is received from the control unit, wherein a user preference determines whether to repeat extracting a single picture image from a random location of the video file, sequential locations of the video file, or a combination of random and sequential locations of the video file.

10. The electronic device of claim 9, wherein the screen saver application displays the single picture image in a random location on the display associated with the electronic device.

11. The electronic device of claim 9, wherein the storage device comprises a DVD.

12. The electronic device of claim 9, wherein the screen saver application is further operable to apply a fade-in/fade-out function of the extracted single picture image during the performance of the screen saving function.

* * * * *